United States Patent [19]
Gates et al.

[11] Patent Number: 6,141,968
[45] Date of Patent: Nov. 7, 2000

[54] FUEL NOZZLE FOR GAS TURBINE ENGINE WITH SLOTTED FUEL CONDUITS AND COVER

[75] Inventors: Roger Jonathan Gates, Montreal; Pierre Juteau, St. Jean Baptiste; Giovanni Mario Mulas, Montreal; Harris Shafique, Longueuil; Bastien Ste. Marie, Varennes; Lev Alexander Prociw, Elmira; Richard Alan Kostka, Maple, all of Canada

[73] Assignee: Pratt & Whitney Canada Corp., Longueuil, Canada

[21] Appl. No.: 08/960,331

[22] Filed: Oct. 29, 1997

[51] Int. Cl.[7] ........................................ F02C 3/00
[52] U.S. Cl. .................. 60/740; 60/39.31; 60/746; 60/742; 239/423
[58] Field of Search .................... 6/39.31, 261, 267, 6/740, 742, 746, 739; 239/423, 424; 138/115, 117

[56] References Cited

U.S. PATENT DOCUMENTS

| | | | |
|---|---|---|---|
| 836,121 | 11/1906 | Kirkpatrick | 138/117 |
| 1,211,792 | 1/1917 | Van Boden | 239/423 |
| 1,321,976 | 11/1919 | Brown | 239/423 |
| 3,335,567 | 8/1967 | Hemsworth | 60/739 |
| 3,595,025 | 7/1971 | Stockel | 60/267 |
| 3,662,959 | 5/1972 | Sample, Jr. | 239/533 |
| 3,684,186 | 8/1972 | Helmrich . | |
| 3,925,983 | 12/1975 | LaBotz | 60/267 |
| 4,078,604 | 3/1978 | Christl et al. | 60/267 |
| 4,193,260 | 3/1980 | Carlisle et al. | 60/746 |
| 4,578,946 | 4/1986 | Readman et al. . | |
| 4,609,150 | 9/1986 | Pane, Jr. et al. . | |
| 4,726,192 | 2/1988 | Willis et al. . | |
| 4,735,044 | 4/1988 | Richey et al. . | |
| 4,742,685 | 5/1988 | Halvorsen et al. . | |
| 4,815,664 | 3/1989 | Tuthill et al. . | |
| 4,941,617 | 7/1990 | Russell . | |
| 5,335,490 | 8/1994 | Johnson et al. . | |
| 5,396,763 | 3/1995 | Mayer et al. | 60/261 |
| 5,417,054 | 5/1995 | Lee et al. | 60/742 |
| 5,423,178 | 6/1995 | Mains . | |
| 5,570,580 | 11/1996 | Mains . | |
| 5,598,696 | 2/1997 | Stotts . | |
| 5,765,360 | 6/1998 | Schmidt et al. | 60/267 |

FOREIGN PATENT DOCUMENTS

335825  8/1903  France ................................. 138/117

*Primary Examiner*—Ted Kim
*Attorney, Agent, or Firm*—Jeffrey W. Astle

[57] ABSTRACT

A stem member for a gas turbine fuel nozzle includes inlet and outlet ends which are respectively adapted to be connected to a fuel adapter which is coupled to a fuel injector and a tip assembly having at least one spray orifice for atomizing fuel into a combustion chamber. The stem member further includes at least one slot which is sealed throughout the length thereof by a slot cover so as to define at least one fuel conduit for directing fuel flow from the inlet end to the outlet end of the stem member. An outer shield can be disposed outwardly of the stem member to protect and limit the transfer of heat from the surroundings to the stem member.

10 Claims, 3 Drawing Sheets

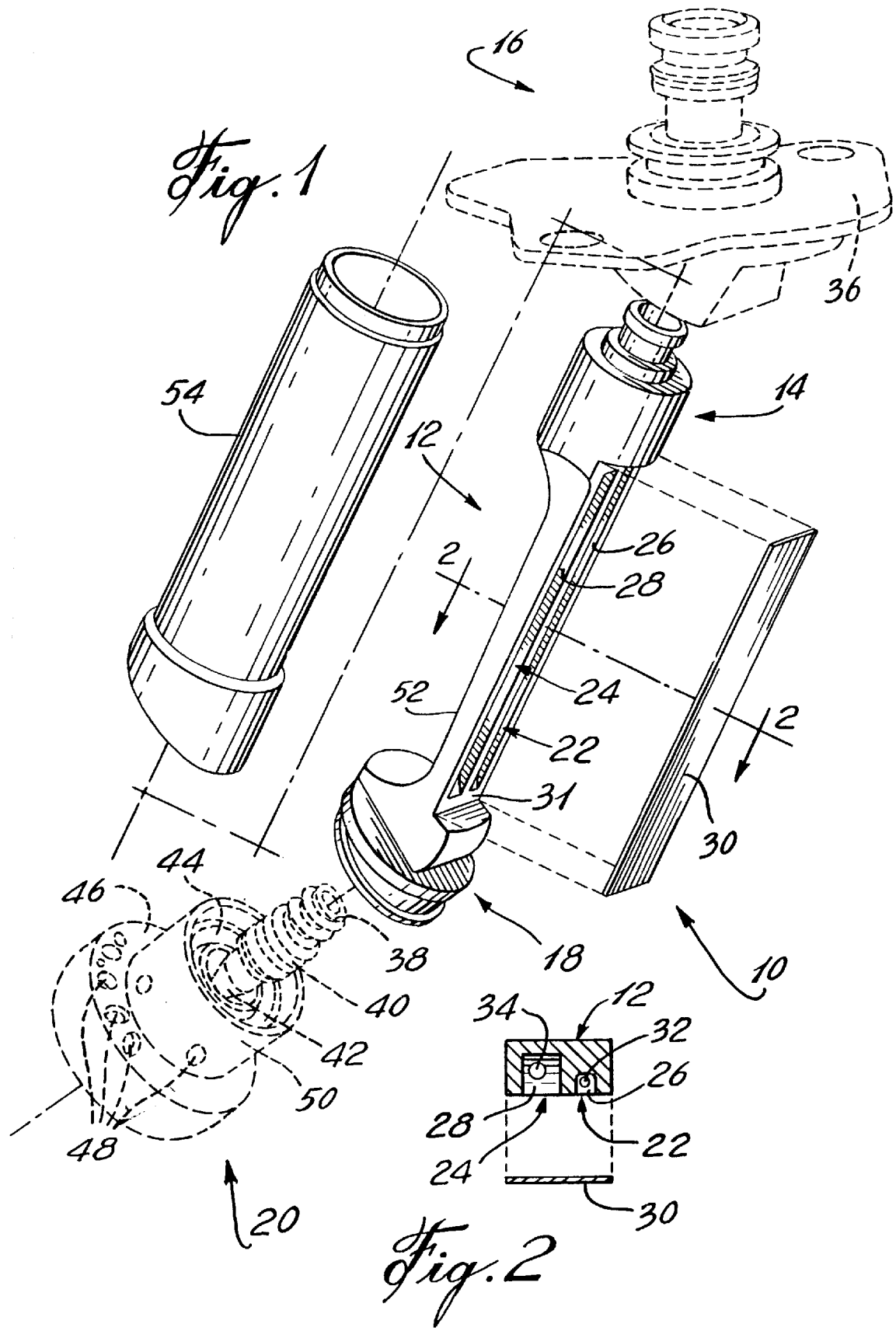

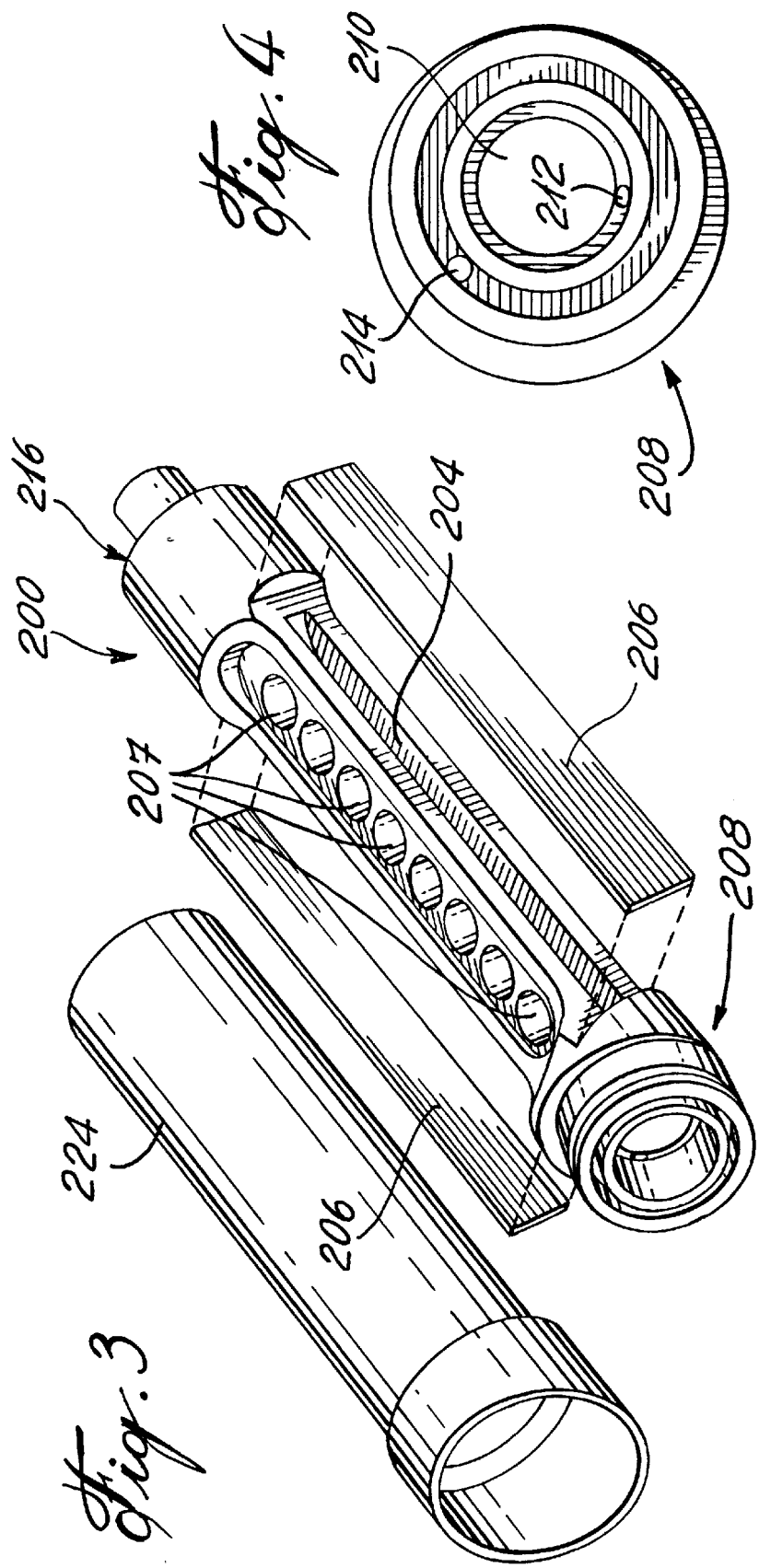

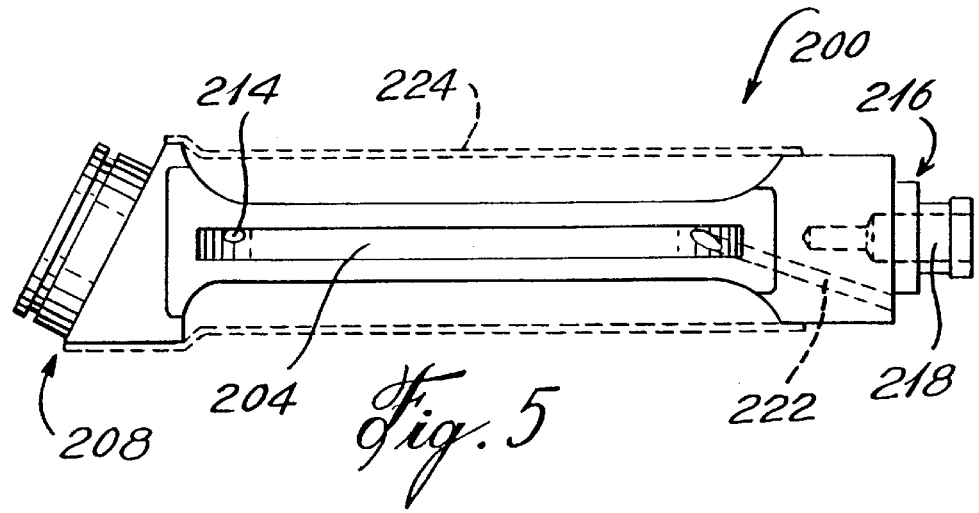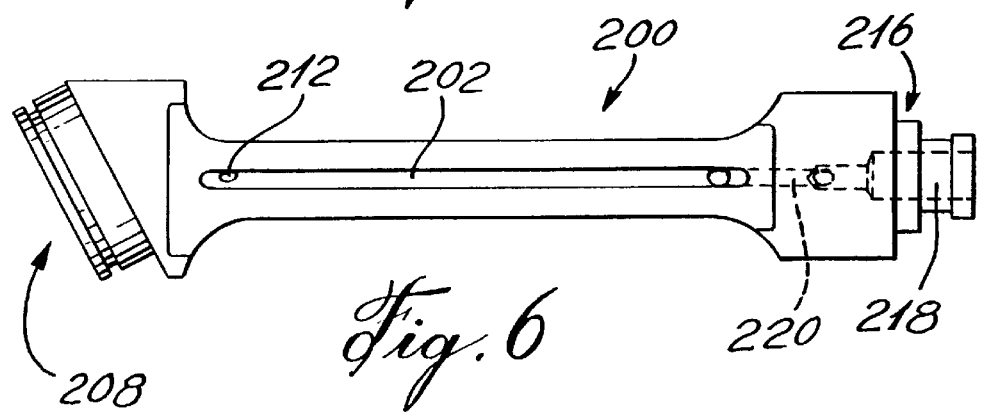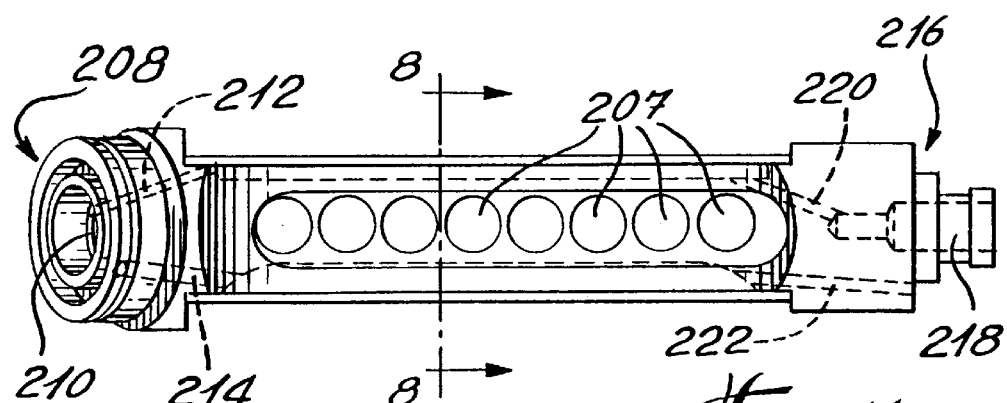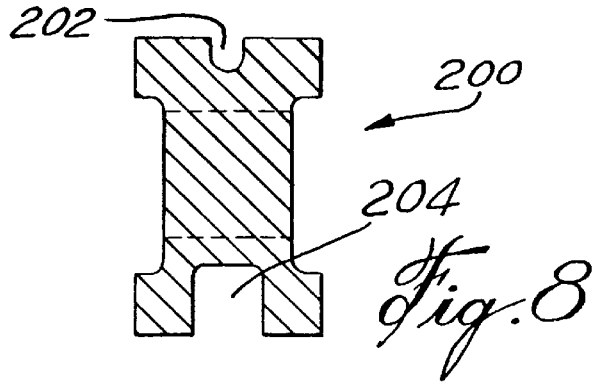

FUEL NOZZLE FOR GAS TURBINE ENGINE WITH SLOTTED FUEL CONDUITS AND COVER

BACKGROUND OF THE INVENTION

1. Field of the Invention

The present invention relates to a fuel nozzle for gas turbines engines and, more particularly, to a fuel nozzle stem through which distinct fuel conduits can be defined.

2. Description of the Prior Art

Fuel nozzles for gas turbine engines are well known in the prior art. Such conventional fuel nozzles are used to supply fuel to a combustion chamber which is provided for igniting the fuel mixture, thereby producing the energy which is used to power the engine. Generally, the combustion chamber includes a plurality of fuel nozzles to thus ensure a proper distribution of the fuel mixture within the combustion chamber.

Conventional fuel nozzles include an inlet housing which is coupled to a fuel injector, a stem portion which defines dual fuel passages and at least one tip assembly of the nozzle for spraying or atomizing fuel into the combustion chamber. More particularly, the stem portion of such fuel nozzles consists of a primary tube and a secondary tube which are disposed within an outer tube which is adapted to provide structural support and thermal insulation to the tubing assembly. Indeed, the outer tube is exposed to hot compressor discharge air and thus some spacers are required to protect the inner tubes, i.e., the primary and secondary tubes, from contact with the hot outer tube.

Typically, the primary tube and the secondary tube are concentrically disposed within the outer tube so as to define two distinct conduits for directing primary and secondary fuel flows respectively. More particularly, the primary fuel is conveyed through a conduit of circular cross-section defined by the primary tube while the secondary fuel is delivered through the annular space defined between the primary and the secondary tube.

According to another configuration of the above fuel nozzle, the primary and the secondary tubes are not concentrically disposed within the outer tube, and thus the secondary fuel flows through the circular conduit of the secondary tube instead of passing through the annular space which is comprised between the primary and secondary tubes of the previous concentric structure. U.S. Pat. No. 4,735,044, issued on Apr. 5, 1988 to Richey et al, and U.S. Pat. Nos. 5,423,178 and 5,570,580, respectively issued on Jun. 13, 1995 and Nov. 5, 1996 to Mains, disclose such a dual stem for a gas turbine fuel nozzle.

U.S. Pat. No. 3,684,186, issued on Aug. 15, 1972 to Helmrich, and U.S. Pat. No. 4,609,150, issued on Sep. 2, 1986 to Pane, Jr. et al, teach having fuel and air passages which extend through a single element. More particularly, U.S. Pat. No. 3,684,186 discloses an aerating fuel nozzle which comprises a primary fuel passage, a secondary fuel passage and a plurality of circumferentially spaced air passages, all these passages being drilled through the main support structure of the fuel nozzle or defined by the space that exists between some adjacent components of the aerating fuel nozzle. U.S. Pat. No. 4,609,150 discloses a fuel nozzle which is cast into two distinct portions, one being the main support structure and the other being the nozzle head. More particularly, a fuel passage and an air passage are cast into the main support structure, and the nozzle head is provided with air swirler vanes, a frusto-conical air passage and a fuel swirl orifice plate. The head portion is welded to the end of the nozzle support portion so as to form an integral fuel nozzle.

SUMMARY OF THE INVENTION

It is, therefore, an aim of the present invention to provide an improved nozzle stem member which is adapted to convey fuel from a fuel injector to a combustion chamber.

It is also an aim of the present invention to provide such a stem member which is relatively simple and economical to manufacture.

A construction in accordance with the present invention comprises a stem member for a gas turbine fuel nozzle having inlet and outlet ends. The stem member includes a solid piece of material. Slot means are defined in the periphery 30 of the solid piece and extend between the inlet and outlet ends of the stem member. The slot means are sealed throughout the length thereof by cover means so as to define at least one fuel conduit for directing fuel flow from the inlet end to the outlet end.

Typically, the inlet end is adapted to be coupled to a fuel adapter which is connected to a fuel injector for supplying fuel through the stem member. The outlet end of the stem is adapted to be coupled to a spray tip assembly which is provided with at least one spray orifice through which fuel can be atomized for combustion purposes.

Also typically, an outer shield means surrounds said stem member for providing thermal insulation to said stem member. More specifically, the shield means is a cylindrical sleeve which is supported at opposite ends thereof by the stem member. The cylindrical sleeve is spaced apart from the stem member between the opposite ends thereof.

In a more specific construction in accordance with the present invention, the inlet and outlet ends of the stem member are each provided with primary and secondary conduits. The slot means function as a primary and a secondary fuel conduit which are respectively connected in flow relationship with the primary conduits and the secondary conduits, whereby a primary and a secondary fuel flow can pass through the stem member. The primary and secondary fuel conduits can be disposed on the same side of the stem member and include a single cover means. Alternatively, the primary and secondary fuel conduits can be disposed on opposite sides of the stem member and can include a distinct cover means for each such fuel conduits. According to another general aspect of the present invention, there is provided a stem member for a gas turbine fuel nozzle, including a body having a peripheral surface, slot means machined in said peripheral surface, cover means cooperating with said slot means to define at least one fuel conduit having inlet and outlet ends, whereby at least one fuel flow can pass through said stem member.

A method in accordance with the present invention of forming a stem member for a gas turbine fuel nozzle comprises the steps of first preparing a solid piece of material. Second, the opposite ends of the solid piece of material are bored for defining inlet and outlet ends. Third, slot means are defined along the portion of the length of the solid piece of material which extends between the inlet and outlet ends. Finally, the slot means are sealed with cover means so as to define at least one fuel conduit to convey a fuel flow from the inlet end to the outlet end of the stem member.

BRIEF DESCRIPTION OF THE DRAWINGS

Having thus generally described the nature of the invention, reference will now be made to the accompanying drawings, showing by way of illustration a preferred embodiment thereof, and in which:

FIG. 1 is an exploded perspective view of a stem member of a gas turbine fuel nozzle according to the present invention, with the peripheral elements thereof being shown in dotted lines;

FIG. 2 is a cross-sectional view taken along the line 2—2 of FIG. 1, showing the slots which form the primary and secondary fuel conduits with the respective primary and secondary outlet conduits thereof;

FIG. 3 is a perspective view of the stem member of a gas turbine fuel nozzle according to a second preferred embodiment of the present invention;

FIG. 4 is a plan view of the outlet end of the stem member shown in FIG. 3;

FIG. 5 is a side view of the stem member of FIG. 3, showing the slot which defines the secondary fuel conduit with the secondary inlet and outlet conduits thereof and the outer shield being illustrated in dotted lines;

FIG. 6 is a side view of the stem member of FIG. 3, showing the slot which defines the primary fuel conduit with the inlet and outlet conduits thereof;

FIG. 7 is a top plan view of the stem member of FIG. 3; and

FIG. 8 is a cross-sectional view taken along the line 8—8 of FIG. 7 of the stem member of FIG. 3, showing the two slots which form the primary and secondary fuel conduits.

DESCRIPTION OF THE PREFERRED EMBODIMENTS

Now referring to the drawings, and in particular to FIG. 1, a fuel nozzle of a gas turbine engine embodying the elements of the present invention and generally designated by numeral 10 will be described. The fuel nozzle 10 includes a stem member 12 which is adapted to be coupled at the inlet end 14 thereof to a fuel manifold adapter 16 and at the outlet end 18 thereof to a spray tip assembly 20. Accordingly, the spray tip assembly 20 is coupled through the stem member 12 to the fuel manifold adapter 16 which is connected to a fuel injector (not shown). Therefore, the fuel supplied by the fuel injector will be atomized by the spray tip assembly 20 for ignition in a combustion chamber (not shown), as is well known in the art.

More particularly, the stem member 12 includes primary and secondary fuel conduits 22 and 24 for respectively directing a primary and a secondary fuel flow from the inlet end 14 to the outlet end 18 of the stem member 12. The primary and secondary fuel conduits 22 and 24 are formed by two distinct slots 26 and 28 which are defined on the same side of the stem member 12 and closed by a cover 30 welded thereon. More specifically, the cover 30 is fitted within a rectangular cutout portion 31 along which the slots 26 and 28 extend in a collinear fashion. It is noted that the cover 30 and the cutout portion 31 have basically the same length and width. This thus prevents longitudinal displacement of the cover 30 and also facilitates the positioning of the same with respect to the slots 26 and 28. The primary and secondary fuel conduits 22 and 24 are respectively fed through primary and secondary inlet conduits (not shown) which are defined at the inlet end 14 of the stem member 12. As best seen in FIG. 2, primary and secondary outlet conduits 32 and 34 are provided at the outlet end 18 of the stem member 12 for receiving the primary and the secondary fuel flow which are conveyed by the primary and secondary fuel conduits 22 and 24, respectively. Therefore, this configuration of the stem member 12 allows for simultaneously or subsequently directing two distinct fuel flows from an inlet end 14 to an outlet end 18.

A portion of the inlet end 14 of the stem member 12 is adapted to be inserted into a receiving opening (not shown) defined in the bottom portion of the fuel manifold adapter 16. The fuel manifold adapter 16 is provided with primary and secondary fuel outlets (not shown) which can be connected in flow relationship with the primary and secondary inlet conduits (not shown) of the stem member 12. Therefore, once the inlet end 14 of the stem member 12 has been introduced into the receiving opening of the fuel manifold adapter 16 such that the primary and secondary inlet conduits (not shown) of the stem member 12 are properly aligned with the primary and secondary fuel outlets of the fuel manifold adapter 16, the stem member 12 is secured to the fuel manifold adapter 16 by way of welding, brazing or the like. As seen in FIG. 1, the fuel manifold adapter 16 is provided with a flange 36 for mounting the fuel nozzle 10 to the combustion chamber or other casing of the gas turbine engine, as is known in the art.

The outlet end 18 of the stem member 12 is coupled to a spray tip assembly 20 which includes a primary distributor 38, a primary cone 40, and a primary shield 42 which are coupled to receive the primary flow through the primary inlet conduit (not shown), the primary fuel conduit 22, and the primary outlet conduits 32. The spray tip assembly 20 further includes a secondary fuel swirler 44 to receive the secondary fuel flow through the secondary inlet conduit (not shown), the secondary fuel conduits 24, and the secondary outlet conduits 34. Finally, the spray tip assembly 20 includes an outer air swirler 46 which is provided with a plurality of circumferentially spaced air passages 48 which are adapted to convey air flow for blending with the primary and secondary fuel sprays issuing from the primary and secondary spray orifices of the spray tip assembly 20, respectively. The primary distributor 38 and the primary cone 40 are brazed into the receiving opening (not shown) defined at the outlet end 18 of the stem member 12. For its part, the primary shield 42 is brazed to the primary cone 40. The secondary fuel swirler 44 is brazed to the interior surface of the cylindrical portion 50 of the outer air swirler 46. The outlet end 18 of the stem member 12 is brazed to the interior surface of the cylindrical portion 50 of the outer air swirler 46 so as to form an integral assembly.

As seen from FIG. 1, a second cutout portion 52 is defined along a portion of the length of the stem member 12 for lightening purposes. An outer shield 54 has, at opposite ends thereof, inside diameters which generally correspond to the outside diameters of the portions which are adjacent to the cutout portions 31 and 52 of the stem member 12. Therefore, the outer shield 54 can be mounted to the stem member 12 to protect the same from the severe surrounding conditions which prevail in a gas turbine engine. More specifically, the outer shield 54 can be brazed to the stem member 12.

According to the construction of the stem member 12, it is noted that the primary and secondary inlet conduits (not shown), the slots 26 and 28, and the primary and secondary outlet conduits 32 and 34, are all obtained by machining operations. Therefore, primary and secondary fuel conduits 22 and 24 are provided by machining a single solid piece of material. Typically, the stem member 12 is formed of materials, such as stainless steel.

Referring now to FIGS. 3 to 8, another form of the stem member of the present invention is generally designated by the numeral 200. It is seen from FIGS. 3 to 8 that the slots 202 and 204 are defined on opposite sides of the stem member 200. As illustrated in FIG. 8, both slots 202 and 204 are basically U-shaped. However, slot 204 has a larger cross-sectional area which is adapted to receive a secondary fuel flow. It is also observed from FIG. 3 that a distinct cover 206 is provided for each slot 202 and 204. Moreover, a series of holes 207 is defined in the central portion of the stem member 200, i.e., between the two slots 202 and 204, for lightening purposes. These holes 207 extend transversally with respect to the longitudinal axis of the stem member 200.

As best seen from FIGS. 3 and 4, the outlet end 208 of the stem member 200 is provided with a receiving opening 210 into which the primary portion, namely, the primary distributor, the primary cone, and the primary shield, of a spray tip assembly, such as the one described hereinbefore, can be mounted. It is also seen from FIG. 4 that the outlet end 208 of the stem member 200 is provided with primary and secondary outlet conduits 212 and 214 which are respectively connected in flow relationship with associated slot 202 and 204 thereof for supplying a primary and a secondary fuel flow to a spray tip assembly (not shown) having primary and secondary spray orifices. The outlet end 208 and the inlet end 216 of the stem member 200 are nonlinear as best seen in FIGS. 5 and 6. Indeed, the outlet end 208 is machined so as to define an angle with the longitudinal axis of the stem member 200.

Referring now to FIGS. 6 and 7, the inlet end 216 of the stem member 200 is provided with a central opening 218 from which extends a primary inlet conduit 220. The slot 202 is thus respectively connected in flow relationship at opposite ends thereof to primary inlet and outlet conduits 212 and 220, as best seen in FIG. 7. It is also easily seen that the slot 204 is respectively connected in flow relationship at opposite ends thereof with secondary inlet and outlet conduits 214 and 222. This is best seen in FIG. 5 as well as in FIG. 7.

As for the first embodiment of the present invention, an outer shield 224 is provided for protecting the stem member 200, as best seen in FIGS. 3 and 5.

We claim:

1. In a gas turbine fuel nozzle comprising a stem member having inlet and outlet ends respectively coupled in flow communication with a fuel adaptor and a spray tip assembly, the improvement in combination therewith comprising a solid one piece of material forming said stem member and extending continuously from said fuel adaptor to said spray tip assembly, slot means defined in a peripheral surface of said solid one piece of material and extending along a portion of a length thereof comprised between the inlet and outlet ends, said slot means being sealed throughout the length thereof by cover means so as to define at least one fuel conduit for directing fuel flow from said fuel adaptor to said spray tip assembly which are respectively mounted to said inlet and outlet ends defined at opposed end portions of said solid one piece of material.

2. A combination as defined in claim 1, wherein said inlet and outlet ends are each provided with primary and secondary conduits, and wherein said slot means function as a primary and a secondary fuel conduit, said primary and secondary fuel conduits being respectively connected in flow relationship with said primary conduits and said secondary conduits, whereby a primary and a secondary fuel flow can pass through said stem member.

3. A combination as defined in claim 2, wherein said primary and secondary fuel conduits are disposed on the same side of said stem member and wherein said primary and secondary conduits include a single cover means.

4. A combination as defined in claim 3, wherein there is provided a cutout portion in said stem member for lightening purposes.

5. A combination as defined in claim 2, wherein said primary and said secondary fuel conduits are disposed on opposite sides of said stem member and wherein said primary and secondary fuel conduits each includes a cover means.

6. A combination as defined in claim 5, wherein there is provided a plurality of holes for lightening purposes, said holes extending in a plane which is perpendicular to said primary and secondary fuel conduits.

7. A combination as defined in claim 1, wherein an outer shield means surrounds said stem member for providing thermal insulation to said stem member.

8. A combination as defined in claim 7, wherein said shield means is a cylindrical sleeve.

9. A combination as defined in claim 8, wherein said cylindrical sleeve is supported at opposite ends thereof by said stem member and is spaced apart therefrom between said opposite ends, said cylindrical sleeve being brazed to said stem member.

10. In a gas turbine fuel nozzle comprising a fuel adaptor interconnected in flow communication with a spray tip assembly via a stem member, the improvement in combination therewith comprising a one-piece body defining opposed inlet and outlet ends to which said fuel adaptor and said spray tip assembly are adapted to be respectively mounted, slot means defined in a peripheral surface of said one-piece body along a portion of a length thereof extending between said inlet and outlet ends, and cover means cooperating with said slot means to define at least one fuel conduit having opposed ends respectively coupled in flow communication with said fuel adaptor and said spray tip assembly, whereby at least one fuel flow can pass from said fuel adaptor through said stem member to said spray tip assembly.

* * * * *